United States Patent [19]

Schoen

[11] Patent Number: 5,018,267

[45] Date of Patent: May 28, 1991

[54] METHOD OF FORMING A LAMINATE

[75] Inventor: Jerry W. Schoen, Middletown, Ohio

[73] Assignee: Armco Inc., Middletown, Ohio

[21] Appl. No.: 402,310

[22] Filed: Sep. 5, 1989

[51] Int. Cl.$^5$ .............................................. H01F 3/04
[52] U.S. Cl. ........................................ 29/609; 29/414;
29/458; 29/605; 156/295; 156/324; 156/326;
428/194; 428/467; 428/484
[58] Field of Search ............... 29/605, 609, 458, 414;
156/295, 324, 326; 428/194, 467, 484

[56] References Cited

U.S. PATENT DOCUMENTS

| | | | |
|---|---|---|---|
| 372,894 | 11/1887 | Childs | 428/194 |
| 790,452 | 5/1905 | Nenzel | 428/467 |
| 2,914,840 | 12/1959 | Damiano | 29/155.57 |
| 3,112,556 | 12/1963 | Zack | 29/605 |
| 3,652,355 | 3/1972 | Herrick | 156/151 |
| 3,819,427 | 6/1974 | Baesch | 148/122 |
| 4,277,530 | 7/1981 | Miller | 428/216 |
| 4,413,406 | 11/1983 | Bennett et al. | 29/609 |
| 4,882,834 | 11/1989 | Schoen | 29/609 |

FOREIGN PATENT DOCUMENTS

| | | |
|---|---|---|
| 3029058 | 7/1980 | Fed. Rep. of Germany . |
| 2328572 | 5/1977 | France ........................... 156/324 |
| 147516 | 7/1986 | Japan . |
| 278583 | 12/1986 | Japan . |
| 109685 | 5/1987 | Japan ............................. 428/484 |
| 157736 | 7/1978 | Netherlands . |

*Primary Examiner*—P. W. Echols
*Attorney, Agent, or Firm*—R. J. Bunyard; L. A. Fillnow; R. H. Johnson

[57] ABSTRACT

Method for forming a laminate and a product formed therefrom. A thin layer of oil is applied to a facing surface of at least one of a plurality of adjacent sheets and a wax is applied along the longitudinal edges of a facing surface of at least one of the sheets. The sheets are combined into a laminate by being passed between a pair of rollers which apply sufficient pressure to remove excess oil from between the facing surfaces and to spread the wax thereby forming a continuous seal along the longitudinal edges of the laminate. Air between the facing surfaces is displaced by the oil and the wax forms the seal to prevent reentry of the air and seepage of the oil along the longitudinal edges of the laminate. The laminate is tightly held together to permit handling or fabrication without delamination.

15 Claims, 3 Drawing Sheets

METHOD OF FORMING A LAMINATE

BACKGROUND OF THE INVENTION

This invention relates to a method of forming an improved laminate and a laminated core formed therefrom. More particularly, the invention relates to applying a liquid bonding agent and a sealing agent to the facing surfaces of sheets and applying sufficient pressure to the sheets to remove excess liquid bonding agent to displace air from between the facing surfaces of the sheets while spreading the sealing agent to prevent reentry of the air and to prevent seepage of the liquid bonding agent along the edges of the sheets.

There are several applications such as electric power transformers, motors, electronics and catalytic converters employing thin gauge sheets. Thin gauge electrical steel sheets or amorphous metal sheets for electrical applications reduce magnetically induced eddy currents by reducing the cross-sectional area through which those currents may flow. Grain oriented steel sheets have a thickness less than 0.5 mm, typically in the range of 0.18 to 0.35 mm. Amorphous metal sheets typically have a thickness of about 0.02 to 0.05 mm.

It is well known the above type electrical devices are more efficient when the thickness of the sheet is decreased with the lower limit for the sheet thicknesses determined by manufacturing considerations. However, reducing the sheet thickness has undesirable effects on handling and fabrication productivity. Handling tissue-like thin sheets is a problem because the sheets are fragile and prone to damage during handling. The very thinness of the sheets reduces the productivity during processing and fabrication, making the product more labor intensive to utilize.

The prior art discloses adhesives, varnishes, oxides or mixtures thereof which may be applied to the surfaces of sheets so that several of the sheets can be bonded (or laminated) together for simultaneous processing. Processing such a laminate greatly increases productivity and diminishes handling problems since the laminate is thicker and more rigid than a single sheet.

Nevertheless, there are several disadvantages when using adhesives, varnishes or oxides to bond sheets which are discussed at length in pending U.S. patent application Ser. No. 4,882,834, filed Apr. 27, 1987, having a common assignee and incorporated herein by reference. For example, to develop a good bond between sheets requires the bonding agent to be applied as a relatively thick layer creating space between adjacent sheets. This is undesirable for bonded laminates used in electrical applications which are wound or stacked because the increased spacing between the sheets decreases the space factor. Even a thinly applied adhesive is undesirable because it tends to shrink when cured. Such a shrinkage, particularly for thin metal sheets, may strain or induce stress into the sheets. A further disadvantage when using chemical bonding is that an elevated temperature may be required to cure the bonding agent. Such an elevated temperature may diminish the effects of domain refinement treatments for electrical steel sheets. Another disadvantage when using chemical bonding is that the sheets become rigidly connected. Winding a rigidly formed electrical steel laminate into a coil may induce stress thereby increasing core losses of the laminate. A further disadvantage with chemical or ceramic bonding is that the bonding layers tend to be brittle. Cutting, punching or corrugating may fracture a brittle bonded layer causing the sheets to delaminate.

My U.S. Pat. No. 4,882,834 discloses a laminate can be formed that will resist separation indefinitely by applying a liquid of an appropriate viscosity to the facing surfaces of sheets and applying sufficient pressure to the sheets to remove excess liquid and to displace air from between the facing surfaces of the sheets. The liquid remaining between the facing surfaces forms a seal preventing reentry of the air which enables the laminate to resist separation during subsequent processing and fabrication. The laminate formed has no increase in the space between its sheets and no induced stress in its sheets. Unfortunately, some of the liquid remaining between the sheets seeps out from between the sheets along the sheet edges. Such seepage may cause a number of physical problems during subsequent processing of a laminate when punching to form stacked laminates. In the case where transformer oil was used as the bonding liquid to form laminated electrical steel sheets, oil buildup on a punch press caused the laminate to slip in the drive system, making it difficult to obtain precisely mitred cuts such as are needed to build a transformer core from electrical steel sheets. Seepage also may result in the bonding liquid transferring onto the exterior surfaces of the laminated sheets so that stacked cut laminated sheets become stuck together making it difficult to align properly in a core stack. Delamination may even occur when handling the laminated sheets or punchings.

Accordingly, there remains a need for an improved technique for forming a laminate using a liquid bonding agent wherein seepage of the liquid bonding agent from between the facing surfaces of the formed laminate is minimized or prevented.

BRIEF SUMMARY OF THE INVENTION

This invention relates to a method of forming an improved laminate and a laminated core formed therefrom. A liquid bonding agent and a sealing agent are applied to a facing surface of at least one of a plurality of sheets. Pressure is applied to the sheets to remove excess liquid bonding agent and to displace air from between the facing surfaces of the sheets and to spread the sealing agent to form a continuous barrier along each longitudinal edge of the formed laminate to minimize seepage of the liquid bonding agent along the longitudinal edges of the laminate.

Principal objects of my invention are to form a laminate using a liquid bonding agent wherein the laminate resists separation, has no decrease in its space factor, and can be fabricated without delamination.

A feature of my invention is to form a laminate from two or more sheets using a liquid bonding agent and a sealing agent.

Another feature of my invention is to form a laminate using a liquid bonding agent by applying a sealing agent along longitudinal edges of at least one facing surface of a plurality of sheets to form a continuous barrier to prevent seepage of the liquid bonding agent along the longitudinal edges of the formed laminate.

Another feature of my invention is to form a laminate using a liquid bonding agent by applying a sealing agent along longitudinal edges and at a position intermediate the longitudinal edges to at least one facing surface of a plurality of sheets to form continuous barriers along the longitudinal edges and at the intermediate position, slitting the laminate along the intermediate position into narrower width laminates, whereby the sealing agent prevents seepage of the liquid bonding agent along the longitudinal edges of the formed laminates.

Another feature of my invention is to form a laminate using a low viscosity liquid bonding agent and a high viscosity sealing agent to prevent seepage of the bonding agent along longitudinal edges of the formed laminate.

Another feature of my invention is to form a laminate using a liquid bonding agent having a viscosity no greater than about 80 cP at 24° C. and a sealing agent having a viscosity no greater than about 2500 cP at 24° C.

Another feature of my invention is to form a laminate by providing at least two sheets each having a facing surface, applying a liquid bonding agent to one of the facing surfaces of the sheets, applying a sealing agent along the longitudinal edges of one of the facing surfaces, applying pressure to the sheets to remove excess liquid bonding agent from between the surfaces and forming a continuous barrier by spreading the sealing agent between the surfaces as the surfaces are brought into contact with each other, whereby air between the surfaces is displaced by the liquid bonding agent and the sealing agent prevents reentry of the air and minimizes seepage of the liquid bonding agent along the edges of the formed laminate.

Another feature of my invention is to form a laminate from a plurality of grain oriented steel sheets each having a facing surface and a thickness less than about 0.5 mm, passing the sheets along a feedpath at a predetermined speed, applying a liquid bonding agent having a viscosity no greater than about 80 cP at 24° C. to one of the facing surfaces, applying a sealing agent having a viscosity no greater than than 2500 cP at 24° C. along the longitudinal edges of one of the facing surfaces, passing the sheets between a pair of rollers, applying pressure to the sheets by the rollers to remove excess liquid bonding agent from between the surfaces and forming a continuous barrier by the sealing agent between the facing surfaces as the facing surfaces are brought into contact with each other, whereby air between the surfaces is displaced by the liquid bonding agent and the sealing agent prevents reentry of the air and minimizes seepage of the liquid bonding agent along the edges of the formed laminate.

Advantages of my invention include reduction in manufacturing costs of a laminate which can be slit, cut or punched with little or no seepage of the liquid bonding agent and production of fabricated cores using the laminates whose sheets are free from strain and induced stress.

The above and other objects, features and advantages of my invention will become apparent upon consideration of the detailed description and appended drawings.

DETAILED DESCRIPTION OF THE PREFERRED EMBODIMENT

Figure 1:
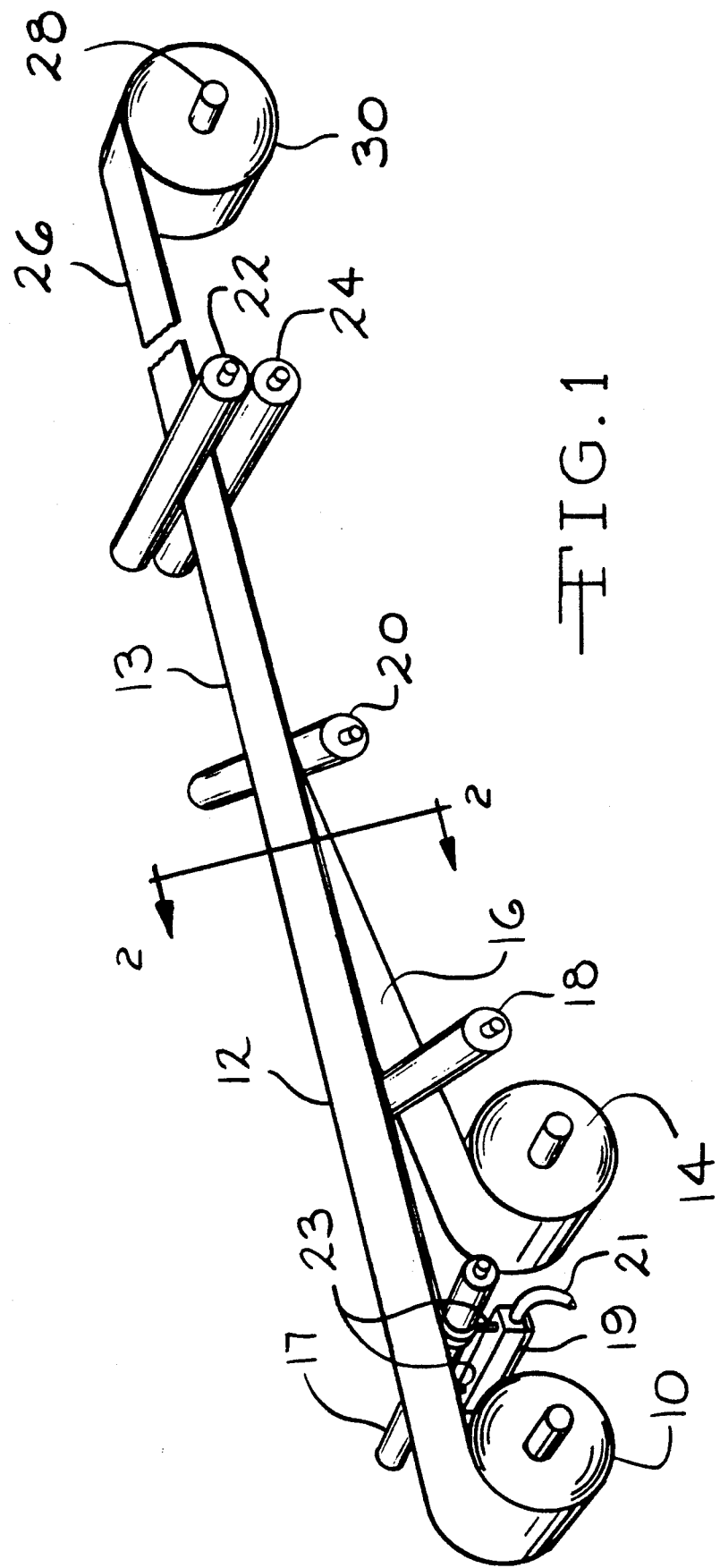
FIG. 1 is a schematic showing two sheets moving along a feedpath being laminated together by a pair of sealing rollers and the laminate being wound into a coil.

Referring to FIG. 1, reference numeral 12 denotes a sheet being uncoiled from a coil 10 and fed at a predetermined speed along a feedpath 13 while passing over a wax applicator 17. Another sheet 16 is fed at the same speed from a coil 14 under an oiling roller 18. Sheet 16 is brought together with sheet 12 by a change of direction roller 20.

For my invention, it will be understood a sheet is meant to include continuous strip, foil, ribbon and the like as well as strip cut into individual lengths. Preferably, the sheet will include cold reduced or cast steel and amorphous base metals having a thickness of less than about 0.5 mm. A more preferred sheet includes grain oriented steel having a glass insulative coating on both sides of the sheet with a total thickness of the sheet and coating layers less than about 0.35 mm. U.S. Pat. No. 3,948,786-Evans, incorporated herein by reference, discloses grain oriented steel having $Mg-PO_4$ glass insulative coatings.

Wax applicator 17 can be any conventional mechanical device such as a sprayer, a capillary-action applicator, a wiping-type roller, an extruder, and the like. For example, wax applicator 17 may include a heater 19, a feed tube 21, and a plurality of nozzles 23 for applying a sealing agent 34 along each longitudinal edge of the facing surface of sheet 12. Oiling roller 18 applies a thin coating of a liquid bonding agent to the facing surface of sheet 16. Sheets 12 and 16 pass between a pair of sealing or consolidation rollers 22 and 24 which apply sufficient pressure to sheets 12 and 16 so that the adjacent (facing) surfaces of sheets 12 and 16 are brought into intimate contact with each other. Continuous films of liquid bonding agent and sealing agent substantially displace all air between the facing surfaces to form a laminate 26. Laminate 26 is wound around a mandrel 28 forming a coil 30.

The clearance between rollers 22 and 24 preferably should not be less than the combined thicknesses of sheets 12 and 16. For grain oriented sheets, rollers 22 and 24 must apply sufficient pressure to remove excess liquid bonding agent to displace air and to spread the sealing agent to form a continuous barrier or seal along both longitudinal edges of the formed laminate without inducing stress into sheets 12 and 16.

FIG. 1 illustrates how a sealing agent is applied by wax applicator 17 to the bottom (facing) surface of sheet 12 and a liquid bonding agent is applied by roller 18 to the top (facing) surface of sheet 16. Wax applicator 17 also could be used to apply the sealing agent to the top (facing) surface of sheet 16 and roller 18 could be used to apply the liquid bonding agent to the bottom (facing) surface of sheet 12. Alternatively, the bonding agent and the sealing agent could be applied to both of the facing surfaces of sheets 12 and 16. It will be understood the sealing agent can be applied to a facing surface of a sheet in a number of patterns such as a continuous line, parallel lines, squares, cross-hatched lines, sinusoidal lines, an extruded bead, and the like so long as a continuous barrier is formed along the longitudinal edges when laminating the sheets. The liquid bonding agent can be applied as a roller coating or sprayed as a fine mist. Depending on the equipment available, the number of sheets simultaneously fed along feedpath 13 and the type of material being laminated, it may be advantageous to apply the liquid bonding agent and the sealing agent to a sheet during a previous processing operation. In any event, the liquid bonding agent and sealing agent are applied only to sheet surfaces which are facing surfaces when the sheets are combined into a laminate.

Figure 2:
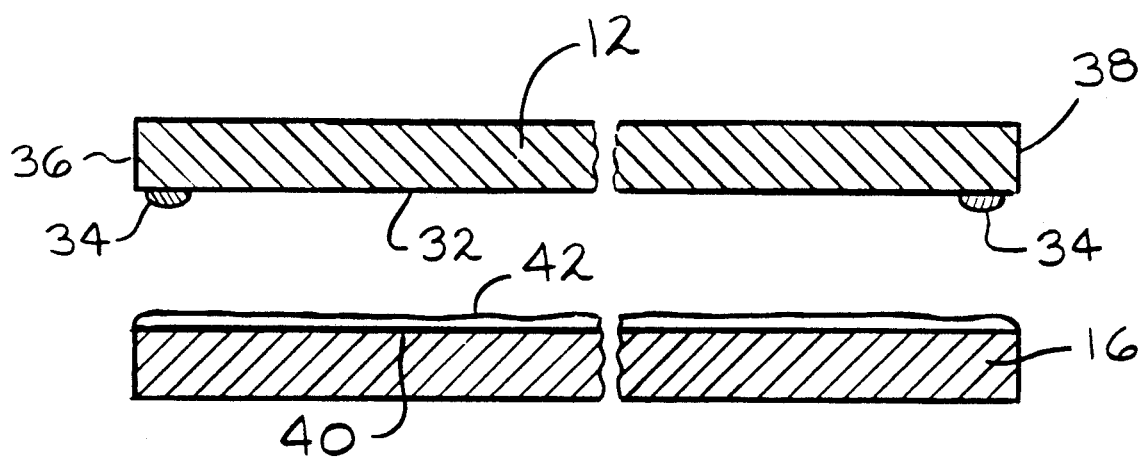
FIG. 2 is a cross-section view along line 2—2 of FIG. 1.

FIG. 2 illustrates a cross-section of sheets 12 and 16 taken along line 2—2 of FIG. 1 before sheets 12 and 16 are combined by rollers 22 and 24 into laminate 26. Small beads of sealing agent 34 are placed along each of the longitudinal edges 36 and 38 on facing surface 32 of sheet 12. A thin film 42 of the liquid bonding agent is placed on facing surface 40 of sheet 16. If laminate 26 is to be slit into narrower widths, additional sealing agent would be applied longitudinally along facing surface 32 at those positions where the laminate is to be slit. For an electrical steel laminate that is to be slit and mitred into core punchings at an angle of 45 degrees, the additional sealing agent applied at those positions to be slit preferably would be in a pattern such as square, cross-hatched, or sinusoidal to insure the sealing agent extends continuously along the longitudinal and transverse edges of the slit and cut laminates.

Figure 3:
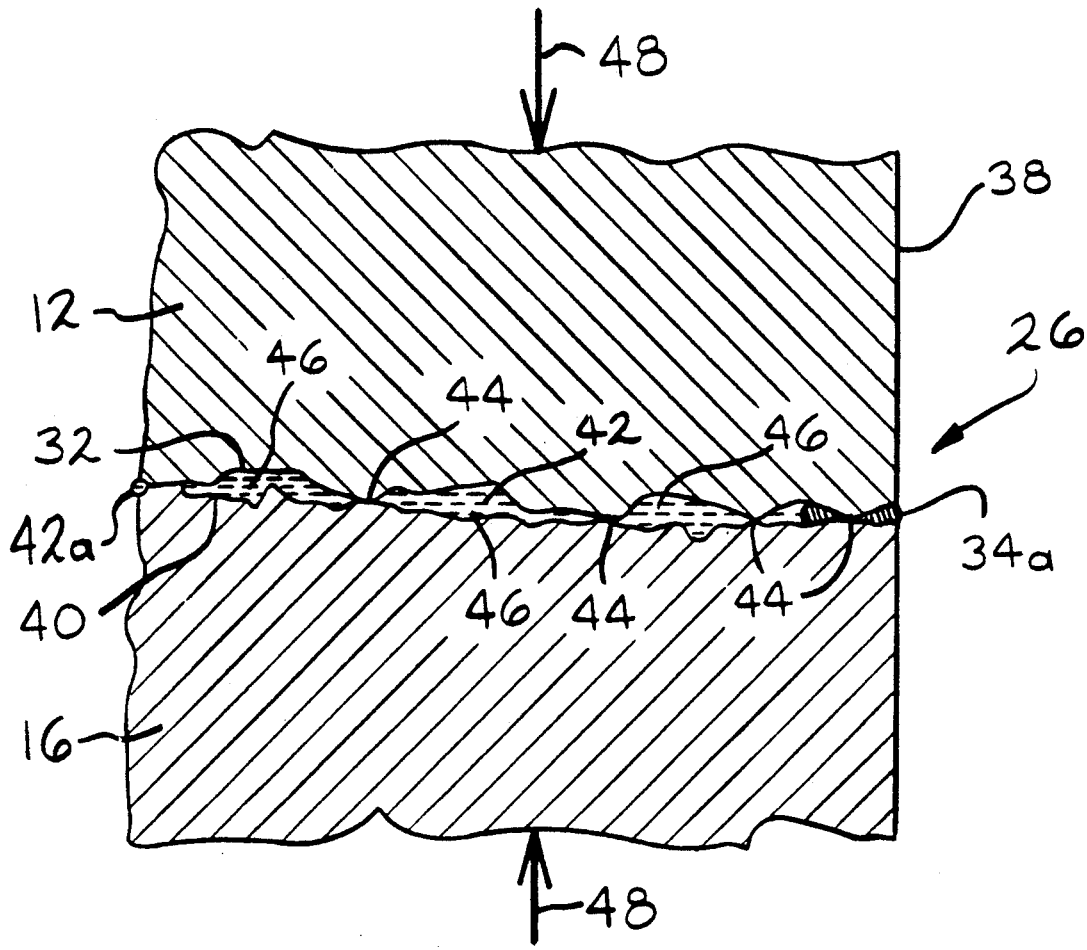
FIG. 3 shows an enlarged fragmentary cross-section view of laminated sheets of my invention.

FIG. 3 illustrates an enlarged fragmentary cross-section view of a portion of laminate 26 formed from sheets 12 and 16 illustrated in FIG. 1. The planar surfaces of metallic sheets normally are not perfectly flat and are somewhat roughened. This means facing surface 32 of sheet 12 will not be in continuous contact with an adjacent facing surface 40 of sheet 16. Facing surfaces 32 and 40 engage each other at point contacts 44. As sheets 12 and 16 are brought into contact with each other by rollers 22 and 24, void areas 46 representing non-contact points between surfaces 32 and 40 are filled with liquid bonding agent 42. Sealing agent 34 is spread to form thin continuous barriers or dams along the longitudinal edges of laminate 26. FIG. 3 illustrates a thin barrier 34a formed by rollers 22 and 24 by spreading sealing agent 34 along longitudinal edge 38. The separation between surfaces 32 and 40 at non-contact points, i.e. void areas 46, will be less than about 0.005 mm. Air is displaced as excess liquid bonding agent is squeezed from between surfaces 32 and 40. A continuous film of sealing agent 34a formed along longitudinal edges 36 and 38 between surfaces 32 and 40 of sheets 12 and 16 prevents reentry of the air and prevents seepage of liquid bonding agent 42 from between facing surfaces 32 and 40 along the longitudinal edges of laminate 26. Accordingly, sheets 12 and 16 are tenaciously held together. Without barriers 34a along the longitudinal edges, liquid bonding agent 42 could seep out from between the sheet facing surfaces as illustrated by seepage 42a.

FIG. 2 illustrates beads 34 of sealing agent being applied along longitudinal edges 36 and 38 of sheets 12 and 16. If laminate 26 illustrated in FIG. 3 is slit longitudinally into two or more narrower width laminates, liquid bonding agent 42 could seep from between facing surfaces 32, 40 along the newly cut longitudinal edges of the narrower laminates. In this situation, it is desirable to apply additional sealing agent 34 along the facing surface of the sheet at those positions corresponding to where the sheet would be slit so that both longitudinal edges of each laminate include a continuous sealing barrier 34a. For a laminate to be slit into two laminates of equal width, sealing agent 34 would be applied to the facing surface approximately midway between opposing edges 36, 38.

Not being bound by theory, it is believed the laminate is tightly held together by a pressure differential existing between voids 46 filled with the liquid bonding agent and/or sealing agent and the ambient atmospheric pressure surrounding laminate 26. In other words, sheets 12 and 16 resist delamination since the interlaminar pressure upon separation would decrease below ambient atmospheric pressure pushing against the outside surfaces of laminate 26 as illustrated by arrows 48 in FIG. 3. Facing surfaces 32 and 40 of sheets 12 and 16 respectively include a bead of sealing agent 34 and a thin layer of liquid bonding agent 42. Sheets 12 and 16 are being fed from left to right through the bite of rollers 22 and 24. As rollers 22 and 24 bring surfaces 32 and 40 into intimate contact with each other, a meniscus 50 is formed and displaces air 52 as sealing agent 34 and excess liquid bonding agent 42 are displaced from between facing surfaces 32 and 40.

The liquid bonding agent can be any low viscosity liquid preferably having a viscosity no greater than about 80 cP at 24° C. when applied to the sheets. Using a bonding agent having a higher viscosity makes it difficult to obtain a good space factor and to avoid shifting of the laminated sheets. Acceptable bonding agents include water, alcohol, oil and the like. For higher viscosity bonding agents, it may be desirable to heat the bonding agent to a temperature above ambient for application to the sheet. For cut electrical steel sheets, the bonding agent is formed into a continuous film to provide for continuous interlaminar insulation to preserve magnetic quality. A natural or synthetic transformer oil is preferred for this purpose. The important considerations are that the bonding agent adequately wets the surfaces of the sheets, is compatible with the environment in which the laminate will be used, and has the necessary viscosity.

For a sealing agent, a relatively high viscosity liquid or a solid such as wax can be used having a viscosity preferably greater than about 250 cP at 24° C. Waxes having a viscosity greater than about 2500 cP at 24° C. are difficult to extrude. The added force necessary to extrude thick resin-like waxes could produce microplastic strain to the sheets which would harm the core loss of electrical steel. A sealing agent which is solid at ambient temperature, such as hard beeswax, would induce coil set and harm the stress condition of electrical steel. As in the case of the liquid bonding agent, it may be desirable to heat higher viscosity sealing agents to a temperature above ambient for application to sheets. The important considerations for the sealing agent are the same as that for the liquid bonding agent and additionally to have sufficient viscosity to retard or prevent seepage of the liquid bonding agent through the continuous barriers formed along the longitudinal edges of the laminate.

Figure 4:
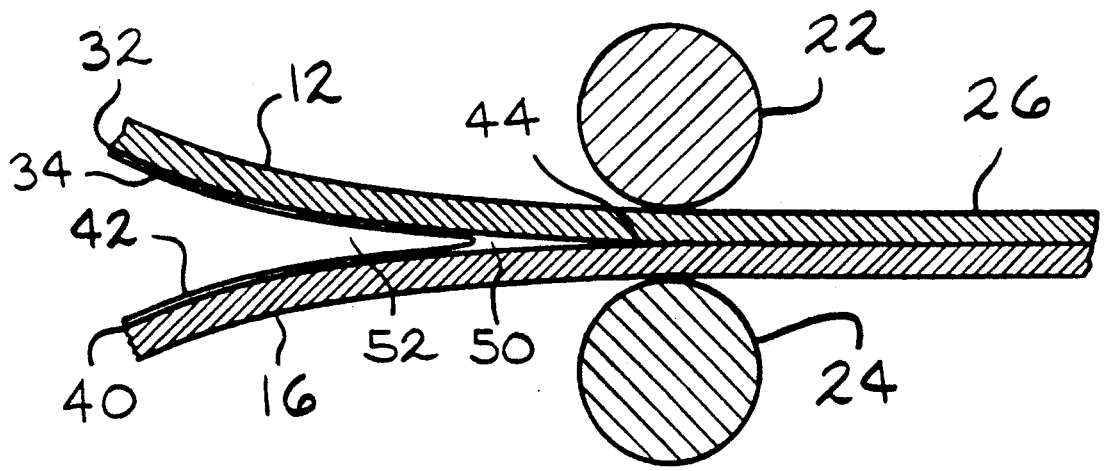
FIG. 4 shows an enlarged longitudinal section view of two sheets being pressed together according to my invention.

Viscosity is a measurement of a liquid's resistance to flow due to the attraction between molecules. The greater the attractive force, the slower the liquid is to flow. The viscosity of the liquid bonding agent and the sealing agent used is important because it effects the flow rate of meniscus 50 between facing surfaces 32 and 40 when joined together by rollers 22 and 24 as illustrated in FIG. 4.

As disclosed in U.S. Pat. No. 4,882,834, I have determined experimentally that a variety of low viscosity liquids perform well as a bonding agent. Cores used as transformers in electric power transmission frequently are permanently immersed in and cooled by a transformer oil. Using this oil as the bonding liquid is particularly advantageous in that it is compatible with the transformer oil. For some applications, the formed core may receive a final heat treatment before its end use. For those heat treated cores where carbon in a hydrocarbon based liquid bonding agent could contaminate the sheet base metal, i.e. grain oriented steel, a synthetic non-carbonaceous oil could be used as the bonding agent.

EXAMPLE 1

By way of example, conventional grain oriented electrical steel sheets 7.65 cm wide, 30.5 cm long and 0.18 mm thick were coated with a 5-6 gm/m$^2$ insulative coating applied over a mill glass coating. In tests 1-3, only a liquid bonding agent was applied to the sheets. A silicone type transformer oil having a nominal viscosity of 40 cP at 24° C. was applied by brushing oil onto one facing surface of each pair of the steel sheets. Two sheets were laminated by passing the sheets through a pair of 76 mm diameter neoprene rollers and applying sufficient pressure to remove excess transformer oil and to displace air from between the facing surfaces. In tests 4-6, only a sealing agent was used. An organic wax having a viscosity of 500 cP at 24° C. was applied by contact wiping onto one facing sheet surface as a series of parallel lines each having a width of about 10 mm and spaced at about 25 mm intervals along the longitudinal (rolling) direction of the sheets. The wax sealing agent was spread into a thin film between the facing surfaces of the sheets by applying sufficient pressure to the exterior surfaces of the sheets. All the tests were evaluated immediately after laminating and after subjected to metal cutting. Tests 1-3 resulted in good quality laminates and preserved the intrinsic magnetic quality of the grain oriented electrical steel. Average core loss at 15 kG and 17 kG was increased by 0.8% and 0.9% respectively. However, seepage of the transformer oil from between the sheets along the edges was evident during consolidation of the sheets and during shearing of the laminates. As was expected for tests 4-6, seepage did not occur since only a high viscosity sealing agent was used. However, the laminates produced were of poor quality which experienced considerable deterioration in their magnetic quality when sheared. Average core loss at 15 kG and 17 kG increased 5.1% and 5.2% respectively. Tests 4-6 demonstrate that the use of a sealing agent alone without a liquid bonding agent to form a continuous film between the sheet facing surfaces will not prevent deterioration of magnetic quality. Metal-to-metal contact, i.e. interlaminar "shorting", occurs when continuous interlaminar insulation is lacking and produces circulating or eddy currents during AC magnetization. This shorting is the result of loss of the insulative coating from the sheet surfaces if the formed laminate is cut when making cores. When a continuous film of the liquid bonding agent is present, the insulative coating still flakes off when cutting the metal sheets but the bonding agent apparently holds the powdered insulative coating at the point of cutting keeping the sheets from coming into contact with each other.

EXAMPLE 2

High permeability oriented electrical steel sheets 7.65 cm wide, 30.5 cm long and 0.23 mm thick were coated with a 9-10 gm/m$^2$ insulative coating applied over a mill glass coating. In tests 7-10, the same liquid bonding agent was applied in a similar manner to that for tests 1-3 above. The same sealing agent and a similar method of application to that for tests 4-6 was used for tests 11-14 except the sealing agent was applied in a series of parallel bands with each band having a width of about 10 mm and spaced at about 30 mm intervals. All the tests again were evaluated immediately after laminating and after subjected to metal cutting. The results for the laminates produced from tests 7-14 were substantially the same as reported above for tests 1-6. Magnetic quality for laminates made from tests 7-10 using only a liquid bonding agent was good but seepage of the bonding agent occurred during consolidation of the sheets and after shearing of the laminates. Average core loss at 15 kG and 17 kG increased −0.3% and 0.8% respectively. The laminates produced from tests 11-14 were of poor quality and the average core loss at 15 kG and 17 kG increased 2.4% and 4.3% respectively.

EXAMPLE 3

Additional laminates were prepared according to the invention from sheets identical to those for Example 2. Sheets for tests 15-17 had the same liquid bonding agent and manner of application as described for tests 1-3 in Example 1. After applying the liquid bonding agent to the sheets, the sealing agent described for tests 4-6 in Example 1 was applied also to tests 15-17 in the form of a 10 mm wide bead along the longitudinal and transverse edges of the sheets. The sheets were then consolidated into laminates in the same manner as that described for tests 4-6 in Example 1. No seepage of the bonding agent along any of the edges of the laminates occurred after consolidation of the sheets or after shearing of the laminates. The magnetic quality of the laminates was excellent both before and after shearing. The average core loss for 15 kG and 17 kG was well within the range of the test results reported above when only liquid bonding agent was used for tests 1-3 for Example 1 or tests 7-10 for Example 2. During consolidation of the sheets, it was demonstrated the sealing agent was spread into a thin continuous film along the edges of the formed laminates which retained the liquid bonding agent between the facing surfaces of the sheets forming the laminates.

Results of the trials discussed above are summarized in Table 1.

TABLE 1

| Test No. | Laminate Quality After Shearing | Seepage After Shearing ? |
|---|---|---|
| 1 | good | yes |
| 2 | good | yes |
| 3 | good | yes |
| 4 | poor | no |
| 5 | poor | no |
| 6 | poor | no |
| 7 | good | yes |
| 8 | good | yes |
| 9 | good | yes |
| 10 | good | yes |
| 11 | poor | no |
| 12 | poor | no |
| 13 | poor | no |
| 14 | poor | no |
| 15 (invention) | good | no |
| 16 (invention) | good | no |
| 17 (invention) | good | no |

While only one embodiment of my invention has been described, it will be understood various modifications may be made to it without departing from the spirit and scope of it. For example, various liquid bonding agents and sealing agents may be used so long as they are compatible with the environment within which the laminate is to be used and have the necessary viscosity to form a seal when formed into very thin layers. Two or more sheets may be laminated simultaneously using various means to apply the liquid bonding agent and sealing agent to the facing surfaces of at least one of the sheets. One or both surfaces of the sheets may have previously applied coatings such as metallic or glass insulative coatings. The laminate may be wound into a core, formed into a stacked core of cut laminates or otherwise fabricated. Therefore, the limits of my invention should be determined from the appended claims.

I claim:

1. A method of forming a laminate, comprising the steps of:
   providing at least two sheets each having a facing surface,
   applying a liquid bonding agent to one of said surfaces,
   applying a sealing agent along the longitudinal edges to one of said surfaces,
   applying pressure to said sheets to remove excess liquid bonding agent from between said surfaces and forming a continuous barrier along said edges as said surfaces are brought into contact with each other,
   whereby air between said surfaces is displaced by said liquid bonding agent and said sealing agent prevents reentry of said air and minimizes seepage of said liquid bonding agent along said edges.

2. The method as set forth in claim 1 wherein said liquid bonding agent is an oil and said sealing agent is a wax.

3. The method as set forth in claim 2 wherein each of said sheets is grain oriented steel having a thickness less than about 0.5 mm, said surfaces of said sheets being coated with a glass insulating film impervious to said oil and said wax.

4. The method as set forth in claim 3 wherein each of said sheets has a thickness of less than about 0.5 mm and including the additional step of winding said laminate into an electrical transformer core.

5. The method as set forth in claim 3 wherein each of said sheets has a thickness of less than about 0.5 mm and including the additional steps of:
   cutting said laminate without delamination,
   stacking a plurality of said cut laminates into an electrical transformer core.

6. The method as set forth in claim 1 wherein the separation between said surfaces is less than about 0.005 mm after said pressure is applied.

7. The method as set forth in claim 1 including the additional steps of:
   passing at a predetermined speed one of said sheets along a feedpath,
   passing at said speed another of said sheets along said feedpath.

8. The method as set forth in claim 7 wherein said pressure is applied by passing said sheets between a pair of spaced rollers,
   the clearance between said rollers being no less than the combined thicknesses of said sheets.

9. The method as set forth in claim 8 wherein said sealing agent is applied to said surface of one of said sheets and said liquid bonding agent is applied to said surface of another of said sheets as said sheets are passing along said feedpath.

10. The method as set forth in claim 1 wherein said liquid bonding agent has a viscosity of no greater than about 80 cP at 24° C. and said sealing agent has a viscosity of no greater than than 2500 cP at 24° C.

11. A method as set forth in claim 1 wherein the temperature of said liquid bonding agent and said sealing agent is greater than ambient when said liquid bonding agent and said sealing agent are applied to said surface.

12. The method as set forth in claim 1 wherein said sealing agent is applied as a pattern from the group consisting of a continuous line, parallel lines, cross-hatched lines, sinusoidal lines, squares, and an extruded bead.

13. A method of forming a laminate, comprising the steps of:
   providing at least two sheets each having a facing surface,
   applying a liquid bonding agent to one of said facing surfaces,
   applying a sealing agent along the longitudinal edges and at a position intermediate to said edges to one of said surfaces,
   applying pressure to said sheets to remove excess liquid bonding agent from between said surfaces and to form a continuous barrier along said edges and along said intermediate position as said surfaces are brought into contact with each other,
   slitting said laminate along said intermediate position thereby forming a continuous barrier along each of the slit edges between said sheets of the laminates,
   whereby air between said surfaces is displaced by said liquid bonding agent and said sealing agent prevents reentry of said air and minimizes seepage of said liquid bonding agent along said edges of said laminates.

14. A method of forming a laminate from a plurality of grain oriented steel sheets each having a facing surface, each of the sheets having a thickness less than about 0.5 mm, comprising the steps of:
   passing at a predetermined speed one of said sheets along a feedpath,
   passing at said speed another of said sheets along said feedpath,
   applying a liquid bonding agent having a viscosity no greater than about 80 cP at 24° C. to one of said surfaces,
   applying a sealing agent having a viscosity no greater than 2500 cP at 24° C. along the longitudinal edges of one of said surfaces,
   passing said sheets between a pair of rollers,
   applying pressure to said sheets by said rollers to remove excess liquid bonding agent from between said surfaces and forming a continuous barrier by said sealing agent between said surfaces as said surfaces are brought into contact with each other,
   whereby air between said surfaces is displaced by said liquid bonding agent and said sealing agent prevents reentry of said air and minimizes seepage of said liquid bonding agent along said edges.

15. The method as set forth in claim 14 wherein said liquid bonding agent is applied to said one of said sheets and said sealing agent is applied to said another of said sheets as said sheets are passed along said feedpath.

* * * * *